United States Patent
Schneider et al.

(10) Patent No.: US 6,379,438 B1
(45) Date of Patent: Apr. 30, 2002

(54) PLATE FILTER ELEMENT FOR AN AIR FILTER

(75) Inventors: Horst Schneider, Waiblingen; Hans Waibel, Remseck, both of (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 09/806,111
(22) PCT Filed: Sep. 17, 1999
(86) PCT No.: PCT/DE99/03016
  § 371 Date: Mar. 28, 2001
  § 102(e) Date: Mar. 28, 2001
(87) PCT Pub. No.: WO00/18489
  PCT Pub. Date: Apr. 6, 2000

(30) Foreign Application Priority Data
Sep. 30, 1998 (DE) .......................... 198 44 874

(51) Int. Cl.⁷ .......................... B01D 53/04; B01D 39/14
(52) U.S. Cl. .............................. 96/154; 55/497; 55/502; 55/DIG. 5; 156/73.1
(58) Field of Search .......................... 55/490, 491, 497, 55/502, 511, 521, DIG. 5; 96/135, 154; 210/493.2; 156/73.1, 73.2; 228/1.1, 110.1

(56) References Cited

U.S. PATENT DOCUMENTS

| | | | | |
|---|---|---|---|---|
| 4,056,376 A | * | 11/1977 | Schuldenfrei | 55/521 |
| 4,617,122 A | * | 10/1986 | Kruse et al. | 210/493.3 |
| 4,701,197 A | * | 10/1987 | Thornton et al. | 55/487 |
| 5,167,740 A | * | 12/1992 | Michaelis et al. | 55/500 |
| 5,639,287 A | * | 6/1997 | Van de Graaf et al. | 55/521 |
| 5,792,228 A | * | 8/1998 | Fath et al. | 55/497 |
| 6,045,598 A | * | 4/2000 | Fath et al. | 55/490 |

FOREIGN PATENT DOCUMENTS

| | | |
|---|---|---|
| DE | 195 24 677 | 1/1996 |
| DE | 195 30 435 | 2/1997 |
| DE | 197 46 804 | 4/1998 |
| DE | 197 00 340 | 7/1998 |
| EP | 0 383 236 | 8/1990 |
| EP | 0 457 402 | 11/1991 |
| EP | 0 685 251 | 12/1995 |
| JP | 07163818 A * | 6/1995 |

* cited by examiner

Primary Examiner—David A. Simmons
Assistant Examiner—Frank M. Lawrence
(74) Attorney, Agent, or Firm—Collard & Roe, P.C.

(57) ABSTRACT

The invention relates to a plate filter element for an air filter comprising a zigzag-shaped, folded strip material made of an activated carbon nonwoven material. The aim of the invention is to improve the dimensional stability of the activated carbon nonwoven material, especially in the area of an end fold. To this end, the invention provides that an end fold of the strip material comprises a sealing which is formed by gluing or fusing an upper side with an underside of the activated carbon nonwoven material.

17 Claims, 1 Drawing Sheet

PLATE FILTER ELEMENT FOR AN AIR FILTER

CROSS REFERENCE TO RELATED APPLICATIONS

Figure 1:
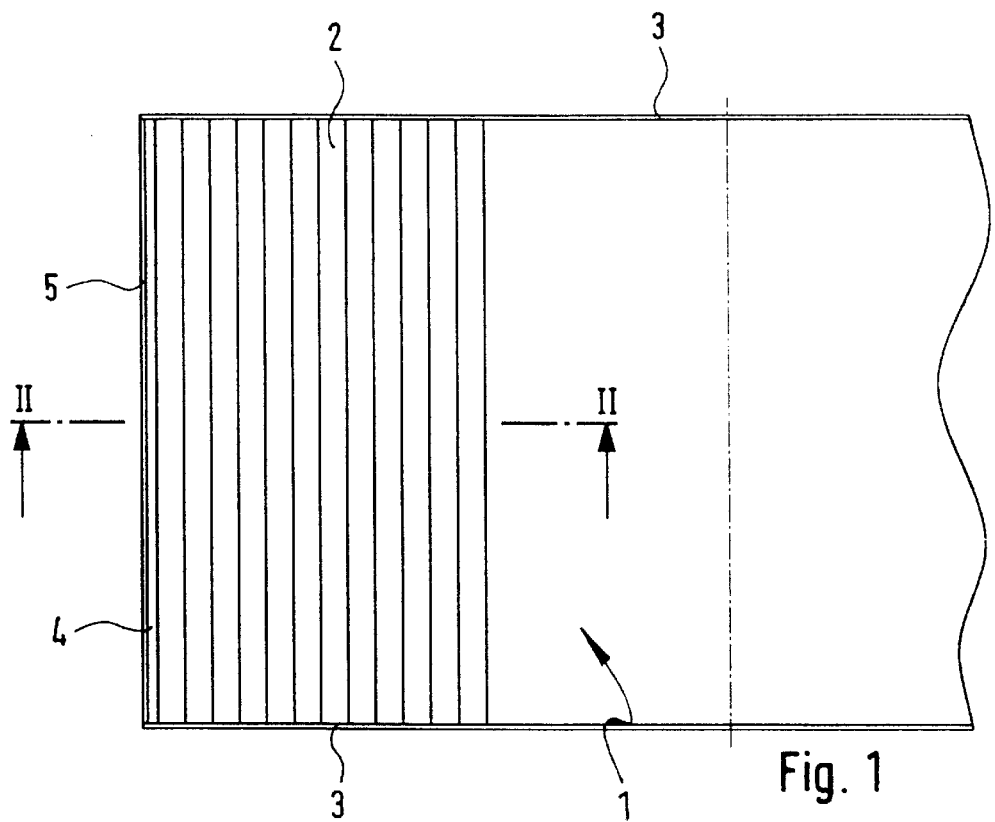

Applicants claim priority under 35 U.S.C. §119 of German Application No. 198 44 874.0 filed Sep. 30, 1998. Applicants claim priority under 35 U.S.C. §120 of PCT/DE99/03016 filed Sep. 17, 1999. The international application under PCT article 21(2) was not published in English.

The invention relates to a plate filter element for an air filter, having a zigzag-folded web material made of an active carbon nonwoven, which has an upper side of nonwoven material and an underside of nonwoven material and active carbon particles arranged between them.

DE 195 24 677 Al discloses a plate filter element which has a zigzag-folded web material. In this filter element, an end fold of the web material is adhesively bonded with a fold adjacent to it. In this case, the mutually opposite sides of the adjacent folds are bonded to one another by means of an adhesive bond in order to achieve sealing of the web material.

Other known plate filter elements have a zigzag folded web material which is formed from an active carbon nonwoven. Such an active carbon nonwoven has at least an upper side made of nonwoven material and an underside made of nonwoven material, active carbon particles being arranged between the upper side and underside. The active carbon particles can in this case adhere by means of an adhesive to the mutually facing inner sides of the upper side of the nonwoven and the underside of the nonwoven. This layer construction forms a deformable nonwoven composite, the active carbon particles being held relatively loosely between the nonwoven layers, so that active carbon particles can be detached from the nonwoven composite, in particular at the edge regions of the active carbon nonwoven.

Fixed to the side edges of the web material, running transversely with respect to the folds, are side bands or side strips which, inter alia, are used to impart dimensional stability to the zigzag-folded active carbon nonwoven. As a result of these side strips, enclosing the folded active carbon nonwoven at the sides, it is additionally possible for active carbon particles to be prevented from emerging laterally from the composite. The side strips are additionally regularly intended to perform a sealing function.

However, at the end folds of the folded active carbon nonwoven, active carbon particles can continue to emerge from the nonwoven composite. In addition, the nonwoven composite can be damaged relatively easily at the end folds, in particular it may split open. This means that the nonwoven layers can become detached from one another. As a result, the introduction of an active carbon nonwoven damaged in this way into an enclosure provided for the end fold, even in a specific frame of the plate filter element or directly in a filter housing, is made more difficult. The end fold of the web material is additionally subjected to a relatively high bending stress as a result of its attachment to the side strips, and this stress, in particular in the center between the side strips, has the effect of bulging out this end fold in the longitudinal direction of the side strips. This stress promotes or supports the splitting open or separation of the layers of the active carbon nonwoven composite.

The present invention tackles the problem of improving the dimensional stability of the active carbon nonwoven in a plate filter element of the type mentioned at the beginning. According to the invention, this problem is solved by a plate filter element having the features of the claims.

The invention is based on the general idea at the exposed end edge of the web material, of joining the upper side of the active carbon filter to the underside of the active carbon nonwoven in a sealed manner, so that firstly it is made more difficult for the active carbon nonwoven composite to split open or for the upper layer to become detached from the under layer and, secondly, the emergence of active carbon particles from the active carbon nonwoven in the area of the end fold is prevented. In order to achieve this, the invention proposes to provide the end fold or its end edge with a seal. Such a seal is in this case achieved by an adhesive bond or by a weld between the upper side and the underside of the active carbon nonwoven.

The adhesive bond for forming the seal is preferably formed with the aid of an adhesive which, for this purpose, penetrates at least partially through the elements to be bonded to one another and embeds them. Alternatively, the bond can also be achieved by one of the elements to be adhesively bonded to each other to be more or less liquefied by melting, the liquefied element penetrating into a non-liquefied element and penetrating at least partially through the latter and embedding it in the melt.

A weld for forming the seal can be achieved, for example, by the elements to be welded to each other being liquefied by melting and, in the process, fusing to one another.

In order to increase the dimensional stability of the end fold further, a development of the invention proposes compressing the web material in the area of the seal. In this way, the strength of the connection formed between the elements connected to one another is increased.

In addition, a process is proposed for the production of the plate filter element according to the invention. According to the process for the production of a plate filter element according to the invention ultrasonic welding is preferred, the ultrasonic "welding" here including both welding in which the two elements to be joined to each other are more or less liquefied and thus fuse to each other or melt together with each other, and also an adhesive bonding in which one of two elements to be joined to each other is more or less liquefied and penetrates at least partially through the non-liquefied element and embeds it in the melt formed.

According to a preferred embodiment of the process according to the invention, firstly an end band which is equipped with a hot-melt adhesive layer is applied to the area of the web material provided for the end fold. The ultrasonic welding operation which follows will liquefy this hot-melt adhesive layer, so that the liquid hot-melt adhesive penetrates through both the end band formed from a nonwoven material and the nonwoven on the upper side and the nonwoven on the underside of the active carbon nonwoven, as well as active carbon particles arranged between the latter, these elements to be joined to one another being embedded in the hot-melt adhesive. In this way, efficient sealing with a high dimensionally stabilizing effect is achieved. This process can preferably be improved by the components to be joined to one another, such as the end band nonwoven and the active carbon nonwoven, being compressed during the ultrasonic welding operation.

Further important features and advantages of the plate filter element according to the invention emerge from the subclaims, from the drawings and from the associated figure description referring to the drawings.

A preferred exemplary embodiment of the invention is illustrated in the drawings and will be explained in more detail in the following description. In the drawings, in each case in schematic form, FIG. 1 shows a plan view of a plate filter element according to the invention, and FIG. 2 shows a sectioned side view corresponding to the section lines II in FIG. 1 on an enlarged scale.

According to FIG. 1, a plate filter element 1 according to the invention has a zigzag-folded web material made of an active carbon nonwoven 2. Transversely with respect to the folds of the active carbon nonwoven 2 the plate filter element 1 is enclosed laterally by side strips or side bands 3. The side bands 3 are preferably composed of a nonwoven material and are welded or adhesively bonded to the ends of the folds. By fixing the side bands 3 to the folds of the active carbon nonwoven 2, dimensional stability can be insured for the zigzag form of the folded active carbon nonwoven 2. In addition, the side bands 3 form a seal.

Figure 2:
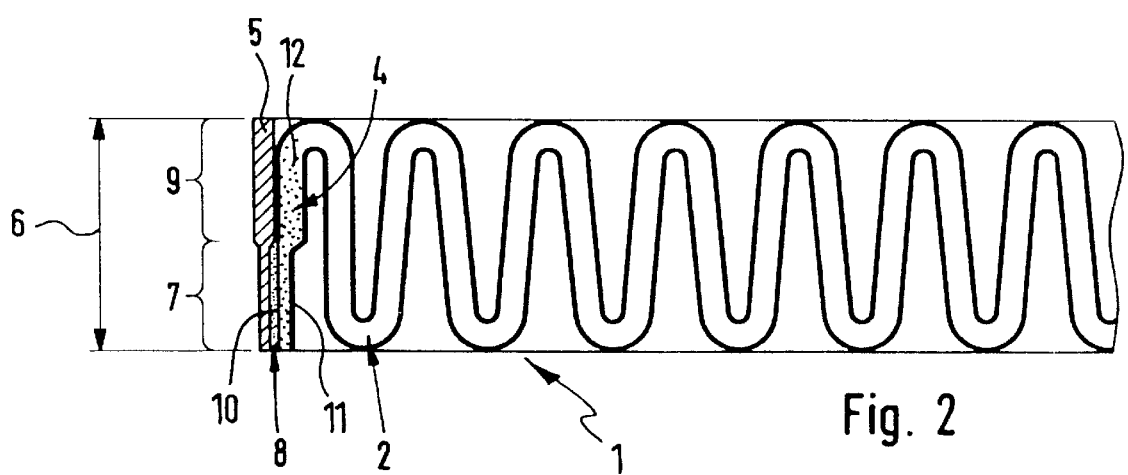

Fixed to an end fold 4, illustrated on the left in FIGS. 1 and 2, is an end band 5. The end band 5 has approximately the same height 6 as the end fold 4. However, the attachment of the end band 5 to the end fold 4 is not carried out over the entire height 6, but only in a subarea 7, which is identified by a curly bracket in FIG. 2 and extends approximately over the lower half of the height 6.

According to FIG. 2, the end band 5 is fitted to the outer side of the end fold 4, facing away from the remaining folds of the active carbon nonwoven 2. Also possible is an embodiment in which the end band 5 is fixed to the inner side of the end fold 4, facing the remaining folds of the active carbon nonwoven 2.

In the subarea 7 in which the attachment of the end band 5 to the end fold 4 is formed, the thickness of the end fold 4 and that of the end band 5 are reduced with respect to the areas located outside the subarea 7. This thickness reduction is based on compression of the material, which is carried out during the formation of the attachment of the end band 5 to the end fold 4.

In order to impart increased dimensional stability to the free end of the end fold 4, and to reduce the emergence of active carbon particles 12 from the active carbon nonwoven 2, the end fold 4 is sealed in the subarea 7. In the preferred embodiment illustrated in FIG. 2, this seal is formed by adhesively bonding an upper-side nonwoven 10 to an underside nonwoven 11 of the active carbon nonwoven 2 by means of an adhesive. For this purpose, the end band 5 bears a hot-melt adhesive layer 8.

In order to form the seal, the end band 5 is placed onto the end fold 4 in such a way that the hot-melt adhesive layer 8 comes to rest on the end fold 4. The elements lying on each other (end band 5 with hot-melt adhesive layer 8, endfold 4) are introduced between a sonotrode and an angle of an ultrasonic welding device and subjected to an ultrasonic welding operation. At the same time, increased pressure is additionally exerted on the elements to be joined to one another, so that the compression mentioned further above takes place.

As a result of the ultrasonic welding operation, in a preferred embodiment, only the hot-weld adhesive layer 8 is more or less liquefied. If appropriate, a hot-melt adhesive in the active carbon nonwoven can also be liquefied, and used there to stick the active carbon particles together. The liquefied hot-melt adhesive penetrates into the nonwoven materials, that is to say into the end band 5, preferably formed from a nonwoven, and into the nonwoven layers of the active carbon nonwoven 2, or at least partially penetrates through these nonwoven materials. Furthermore, the liquid hot-melt adhesive penetrates through the active carbon particles 12 arranged in the active carbon nonwoven between the upper side 10 and the underside 11 of the active carbon nonwoven 2. The non-liquefied components are therefore embedded in the melt of the hot-melt adhesive. As soon as the hot-melt adhesive cools down, a high-strength composite is formed, by means of which, firstly, the free end of the end fold 4 is sealed and by means of which, secondly, the end band 5 is attached to the end fold 4.

A section 9 of the end band 5 which adjoins the subarea 7 attached to the end fold 4 can serve as a seal which seals off the plate filter element 1 with respect to a frame part (not illustrated) of the plate filter element 1 into which the end fold 4 is introduced, or with respect to a filter housing (likewise not illustrated) into which the filter element 1—then without the aforementioned frame part—is introduced. If the end band 5 in the section 9 is to have such a sealing function, it is preferably produced from a nonwoven material.

If such a sealing function is not required of an end band 5, it is not necessary either for the end band 5 to extend over the entire height 6 of the end fold 4. Moreover, the end band 5 itself can also be formed as a hot-melt adhesive. Also possible is a design in which the end band 5 consists of a fusible nonwoven, which is liquefied by the ultrasonic welding and penetrates into the active carbon nonwoven or penetrates through the latter and embeds the non-molten or non-liquefied components in the melt. In this case, a special hot-melt adhesive layer on the end band 5 can be dispensed with.

What is claimed is:

1. A plate filter element for an air filter, having a zigzag-folded web material made of an active carbon nonwoven, which has an upper side of nonwoven material and an underside of nonwoven material and active carbon particles arranged between them, a free end of an end fold (4) of the web material having a seal which is formed by adhesively bonding or by welding the upper side (10) to the underside (11) of the active carbon nonwoven (2).

2. The plate filter element as claimed in claim 1, characterized in that the adhesive bond is formed with an adhesive (8) or by fusing at least one of the elements to be adhesively bonded to each other.

3. The plate filter element as claimed in claim 2, characterized in that a molten element penetrates into a non-molten element (4, 5, 12) of the elements (4, 5, 12) to be bonded to each another, or penetrates at least partially through the latter and embeds it in the melt.

4. The plate filter element as claimed in claim 1, characterized in that the weld is formed by fusing the elements to be welded to each other.

5. The plate filter element as claimed in claim 1, characterized in that the web material is compressed in the area (7) of the seal.

6. The plate filter element as claimed in claim 1, characterized in that the end fold (4) is provided with an end band (5) which is fixed to the end fold (4) by the adhesive bonding or by the welding.

7. The plate filter element as claimed in claim 6, characterized in that the end band (5) has approximately the same height (6) as the end fold (4), and in that the adhesive bond or weld extends over only part (7) of the height (6) of the end fold (4), the end band (5) outside the adhesive bond or weld serving as a seal (9).

8. The plate filter element as claimed in claim 6, characterized in that the end band (5) consists of a nonwoven material.

9. The plate filter element as claimed in claim 2, characterized in that the adhesive (8) is a hot-melt adhesive.

10. The plate filter element as claimed in claim 1, characterized in that the web material, transversely with respect to its folds, is enclosed between two side webs (3) which are formed of a nonwoven material and which are fixed to the web material by adhesive bonding or by welding, and in that the end band (5) is fixed to the side webs (3).

11. A process for producing a plate filter as claimed in claim 1, characterized in that the seal is formed, in an area of the web material provided for the end fold (4), by means of an ultrasonic welding operation in which at least one component (8) of the elements (4, 5, 8, 12) to be joined to one another is more or less liquefied, liquefied components (8) fusing to one another or melting together with one another and non-liquefied components (4, 5, 12) being penetrated through, at least partially, by the at least one liquefied component (8) and embedded in the latter.

12. The process as claimed in claim 11, characterized in that the ultrasonic welding operation liquefies a hot-melt adhesive contained in the active carbon nonwoven (2).

13. The process as claimed in claim 11, characterized in that the ultrasonic welding operation liquefies a hot-melt adhesive layer (8) applied to the end fold (4).

14. The process as claimed in claim 13, characterized in that the hot-melt adhesive layer (8) is applied to an end band (5) attached to the end fold.

15. The process as claimed in claim 11, characterized in that the ultrasonic welding operation more or less liquefies a nonwoven material (10, 11) contained in the active carbon nonwoven (2).

16. The process as claimed in claim 11, characterized in that the ultrasonic welding operation more or less liquefies an end band (5) which is applied to the end fold (4) and consists of a nonwoven material.

17. The process as claimed in claim 11, characterized in that during the ultrasonic welding operation, the elements (4, 5, 8, 12) to be joined to one another are compressed.

* * * * *